United States Patent Office 3,567,634
Patented Mar. 2, 1971

3,567,634
CORROSION INHIBITOR DETERIORATION REDUCER
William E. Billings, London, England, and David Morris, Duncan, Okla., assignors to Halliburton Company, Duncan, Okla.
No Drawing. Continuation-in-part of application Ser. No. 366,607, May 11, 1964, which is a continuation-in-part of application Ser. No. 133,294, Aug. 23, 1961. This application July 24, 1967, Ser. No. 655,282
Int. Cl. C23f *11/04*; E21b *43/28*
U.S. Cl. 252—8.55    4 Claims

ABSTRACT OF THE DISCLOSURE

This patent describes a non-corrosive fluid composition for treating earthen formations containing sulfides, consisting essentially of an aqueous solution of hydrochloric acid, a corrosion inhibiting amount of a hydrochloric acid inhibiting agent subject to deterioration by sulfides, said sulfides being present in a sufficient amount to reduce the effectiveness of said inhibiting agent, and a corrosion inhibitor deterioration reducing agent having the formula of

wherein R is selected from the group consisting of alkyl group and aryl group, each group having from 2 to 10 carbon atoms and said corrosion inhibitor deterioration reducing agent being present in a sufficient amount to reduce the deterioration effect of said sulfides on said inhibiting agent.

---

This application is a continuation-in-part of U.S. application Ser. No. 366,607, filed May 11, 1964, now abandoned which in turn was a continuation-in-part of U.S. application Ser. No. 133,294, filed Aug. 23, 1961, now abandoned, the disclosures of said earlier filed applications being expressly incorporated herein by reference.

BACKGROUND OF INVENTION

In the chemical treating of wells, acidizing with hydrochloric acid comprises a substantial amount of such well stimulation treatment. As hydrochloric acid has a deleterious effect on steel and other ferrous materials normally used in the well, it is customary to include an inhibitor in the hydrochloric acid to minize the undesirable chemical action of the acid on the metal. When hydrogen sulfide, iron sulfide, or other sulfides are present in the zone or earthen formation being treated with the acid, the effectiveness of the acid inhibitor in the hydrochloric acid is substantially reduced.

It is, therefore, an important object of the present invention to provide a new and improved corrosion inhibitor for hydrochloric acid which will not lose its effectiveness in the presence of sulfides.

Another important object of the present invention is to provide a new and improved corrosion inhibitor deterioration reducer which may be added to a hydrochloric acid solution containing an inhibitor to enhance the effectiveness of such inhibitor in the presence of sulfides.

Hydrochloric acid is used by refineries and other commercial enterprises for dissolving sulfide scales which form on their equipment and the like. Because of sulfide accumulation in the acid during such cleaning operations, the acid must be discarded before it is spent. This necessitates the use of considerably more acid than would be theoretically necessary to dissolve the sulfide scale.

SUMMARY OF INVENTION

It has been discovered that the addition of a relatively small amount of a sulfoxide compound will greatly enhance the effectiveness of corrosion inhibitors currently or normally used in hydrochloric acid when such hydrochloric acid is in the presence of or mixed with sulfides, such as hydrogen sulfide, iron sulfide, and the like.

It is an object of the present invention to provide a new and improved corrosion inhibitor for hydrochloric acid used in cleaning sulfide scales which will enable such acid to remain in contact with the equipment being cleaned until the acid has completely reacted or become spent.

Still another object of the present invention is to provide a new and improved inhibiting agent which may be added to an aqueous solution of hydrochloric acid to inhibit or reduce the corrosive effect of such acid on ferrous metals.

A further object of the present invention is to provide a new and improved means for protecting steel casing, steel tubing and other ferrous metal equipment or materials from the harmful effects of hydrochloric acid solutions used in treatment of oil and gas wells.

Yet a further object of the present invention is to provide a new and improved inhibiting agent for reducing the corrosive effects of inhibited hydrochloric acid and particularly inhibited hydrochloric acid in the presence of sulfides, wherein such inhibiting agent is selected from the sulfoxide group of compounds.

Yet a further object of the present invention is to provide a new and improved inhibiting agent for reducing the corrosive effects of inhibited hydrochloric acid on ferrous metals when the inhibited hydrochloric acid is in the presence of hydrogen sulfide, iron sulfide and the like, wherein the inhibiting agent is selected from the group consisting of dibenzyl sulfoxide and ethyl dodecyl sulfoxide.

Yet a further object of the present invention is to provide a new and improved corrosion inhibiting agent for inhibited hydrochloric acid in the presence of sulfides, which comprises a sulfoxide compound, $R_1R_2SO$ wherein $R_1$ and $R_2$ are alkyl or aryl substituents each having from 2 to 10 carbon atoms.

DESCRIPTION OF PREFERRED EMBODIMENTS

In actual laboratory tests dibenzyl sulfoxide, which is a poor inhibitor in hydrochloric acid, was found to be unusually and unobviously effective when used with other inhibitors in reducing the corrosive tendencies of inhibited hydrochloric acid containing sulfides.

Ethyl dodecyl sulfoxide was also effective in reducing corrosive action of hydrochloric acid in hydrochloric acid-sulfide mixtures. It was not quite as efficient as dibenzyl sulfoxide when tested at relatively high temperatures.

It should be noted that although other sulfoxides were not tested, it is reasonably certain that other organic sulfoxide compounds, either aliphatic or benzenoid, either alkyl or aryl, will additionally reduce the corrosive action of inhibited hydrochloric acid in the presence of sulfide compounds to some degree as long as the

grouping is present in the molecule, where R denotes the same or different alkyl or aryl groups.

It should also be noted that the addition of dibenzyl sulfoxide or ethyl dodecyl sulfoxide to hydrochloric acid when no sulfides are present may cause the acid to be more corrosive than if the original inhibitor had been present alone. This increase will be very slight and can probably be ignored.

Laboratory tests have been conducted using successively larger quantities of iron sulfide or hydrogen sulfide dissolved in acid. These tests disclosed that dibenzyl sulfoxide worked as well as when large quantities of sulfides were present in the corrodent as it did when lesser quantities of sulfides were present. This indicates that the dibenzyl sulfoxide does not act as a sulfide scavenger, but rather acts to alter the inhibitor already present so that it is not as susceptible to deterioration as it might otherwise be.

The sulfoxide compounds of the present invention may be added to the hydrochloric acid inhibitor prior to the inhibitor being added to the hydrochloric acid, or they may be added directly to hydrochloric acid which has already been inhibited.

The instant invention is also preferably used when the amount of sulfides encountered is greater than about 50 p.p.m., measured in $H_2S$.

Some examples of laboratory tests are set forth hereinafter:

EXAMPLE I.—CORROSION RATES OF J-55 TUBING IN INHIBITED HYDROCHLORIC ACID CONTAINING SULFIDES.

Corrodent used—15% hydrochloric acid. Immediately prior to test 625 p.p.m. iron sulfide added to acid in 200° F. tests, 5,000 p.p.m. iron sulfide added to 150° F. tests.
Test times—24 hours at 150° F., 18 hours at 200° F.
Inhibitor concentrations—5 gallons per 1,000 at 200° F. on all tests. For the 150° F. tests, 3 gallons per 1,000 without dibenzyl sulfoxide, 2 gallons per 1,000 with dibenzyl sulfoxide.
Quantity dibenzyl sulfoxide used—5 lbs. per 1,000 gallons acid at both 150° F. and 200° F.

|  | Corrosion rates (lbs./ft.²/24 hours) | | | |
|---|---|---|---|---|
|  | 150° F. | | 200° F. | |
|  | With DBS | Without DBS | With DBS | Without DBS |
| Howco acid inhibitor [1] | N.D. | N.D. | 0.07 | 0.11 |
| Rodine 213 [2] | 0.07 | 0.15 | 0.15 | 0.53 |
| Rodine 220 [2] | 0.04 | 0.13 | 0.09 | 0.11 |
| Rodine 203 [2] | 0.02 | 0.08 | N.D. | N.D. |
| Polyrad 0515A [3] | 0.02 | 0.04 | N.D. | N.D. |
| Cronox 220 [4] | 0.31 | 0.39 | N.D. | N.D. |

[1] Howco acid inhibitor and HAI-34—Trade names of acid inhibitors marketed by Halliburton Company and are blends of acetylenic alcohols with selected nitrogen base compounds.
[2] Rodine 203, 220 and 213—Trade names of acid inhibitors marketed by Amchem Products Corporation. Rodine is a registered trademark. Rodine 203 is a liquid cationic corrosion inhibitor in composition with a polycyclic keto-amine hydrochloride. Rodine 220 is an improved version of Rodine 203 and is believed to contain acetylenic alcohol, and Rodine 213 is an acid inhibitor for refinery acidizing.
[3] Polyrad 0515A—Trade name of an acid inhibitor marketed by Hercules Powder Company, and is an ethylene oxide derivative of rosin amine plus free rosin amine in a solution of 15% isopropyl alcohol.
[4] Cronox 220—Trade name of an acid inhibitor marketed by Atlas Chemical Industries Corporation, Aquaness Division, and is believed to contain acetylenic alcohol. Cronox is a registered trademark.

EXAMPLE II

Effect of increasing dibenzyl sulfoxide content in inhibited hydrochloric acid containing sulfides Steel used—J-55 tubing
Temperature—205° F.
Test time—Three hours
Inhibitor—HAI-34,[1] 4 gal./1000
Corrodent—15% hydrochloric acid. Immediately prior to test, 1000 p.p.m. iron sulfide added to acid.

| Quantity DBS added, lbs. per 1,000 gallons: | Corrosion rates (lbs/ft.²/24 hrs.) |
|---|---|
| None | 0.98 |
| 5 | 0.10 |
| 10 | 0.11 |
| 15 | 0.11 |
| 20 | 0.12 |

[1] Howco acid inhibitor and HAI-34—Trade names of acid inhibitors marketed by Halliburton Company and are blends of acetylenic alcohols with selected nitrogen base compounds.

EXAMPLE III

Effect of increasing sulfide content in inhibited hydrochloric acid containing dibenzyl sulfoxide Steel used—J-55 tubing
Temperature—200° F.
Time—18 hours
Inhibitor—HAI-34 [1], 5 gal./1000
Corrodent—15% hydrochloric acid
(Quantity dibenzyl sulfoxide used—5 lbs. per 1000 gallons acid)

| Quantity iron sulfide added, p.p.m.: | Corrosion rate lbs./ft.²/24 hrs.) |
|---|---|
| 625 | 0.04 |
| 2,000 | 0.04 |
| 5,000 | 0.06 |
| $H_2S$ bubbled rapidly through solution for 5 minutes | 0.06 |

[1] Howco acid inhibitor and HAI-34—Trade names of acid inhibitors marketed by Halliburton Company and are blends of acetylenic alcohols with selected nitrogen base compounds.

EXAMPLE IV.—EFFECT OF ETHYL DODECYL SULFOXIDE AND DIBENZYL SULFOXIDE ON CORROSION RATES OF J-55 TUBING IN INHIBITED HYDROCHLORIC ACID CONTAINING SULFIDES

Corrodent—15% hydrochloric acid, to which was added 625 p.p.m. iron sulfide.
Temperature—150° F., 200° F.
Time—150° F. tests for 72 hours, 200° F. tests for 16 hours.
Inhibitor used—HAI-34 [1]
Inhibitor concentration—1½ gal./1,000 at 150° F., 2½ gal./1,000 at 200° F.
Dibenzyl sulfoxide—5 lbs./1,000 gallons.
Ethyl dodecyl sulfoxide—10 lbs/1,000 gallons.

|  | Corrosion rate (lbs./ft.²/24 hrs.) | |
|---|---|---|
|  | 150° F. | 200° F. |
| Ethyl dodecyl sulfoxide | 0.005 | 0.39 |
| Dibenzyl sulfoxide | 0.005 | 0.04 |
| None | 0.61 | N.D. |

[1] Howco acid inhibitor and HAI-34—Trade names of acid inhibitors marketed by Halliburton Company and are blends of acetylenic alcohols with selected nitrogen base compounds.

Additional laboratory tests were made for comparative purposes wherein dibenzyl sulfoxide was tested in hydrochloric acid with and without other inhibitors and both in and without the presence of ferrous sulfide. The results of these tests are as follows:

EXAMPLE V.—MISCELLANEOUS TESTS

| Time, hrs. | Temperature, ° F. | Inhibitor used (gals./1,000 gals.) | Quantity iron sulfide, p.p.m. | Quantity DBS, lbs./1,000 gals. | Corrosion rate, lbs./ft. 24 hrs. |
|---|---|---|---|---|---|
| 6 | 200 | HAI-34 (2½/1,000) | None | None | 0.008 |
| 6 | 200 | HAI-34 (2½/1,000) | None | 5 | 0.016 |
| 10 | 180 | HAI-34 (2/1,000) | 625 | None | 1.39 |
| 10 | 180 | HAI-34 (2/1,000) | 625 | 5 | 0.05 |
| 6 | 180 | Hexynol [1] (1/1,000) | 1,000 | 5 | 0.05 |
| 6 | 180 | Hexynol [1] (1/1,000) | 1,000 | None | 0.50 |
| 24 | 150 | None | 5,000 | 10 | 0.14 |

[1] Hexynol—may also be identified as 1-hexyn-3-ol.

EXAMPLE VI

Procedure

A portion of each sample was tested for inhibiting properties in 15% HCl at 180° F.

Test Conditions

Corrodent—800 cc. of 15% HCl
Concentration of inhibitor—Pounds or gallons/gallons acid
Temperature—180° F.
Time—Six hours
Specimen—J-55 tubing steel (5 sq. in.).

Data

| Sample | Concentration of inhibitor | Percent HCl | Corrosion rate (lbs./sq. ft./24 hrs.) |
|---|---|---|---|
| EX-208 [1] | 30 lbs./1,000 | 15% | 0.500 |
| EX-209 [1] | 30 lbs./1,000 | 15% | 0.410 |
| Lithsolvent FB [2] | 30 lbs./1,000 | 15% | 0.230 |
| EX-209 plus HAI-34 | 20 lbs./1,000 plus 2 gal./1,000 | 15% plus 10 lbs. FeS [3] | 0.047 |
| EX-209 plus HAI-34 | 20 lbs./1,000 plus 1½ gal./1,000 | 15% plus 10 lbs. FeS [3] | 0.065 |
| HAI-34 | 2 gal./1,000 | 15% plus 10 lbs. FeS [3] | 1.269 |
| EX-209 plus HAI-34 | 20 lbs./1,000 plus 2 gal./1,000 | 15% | 0.026 |
| HAI-34 | 2 gal./1,000 | 15% | 0.013 |

[1] EX-208 and EX-209—Trade names of products of Troy Chemical Company, with 208 being crude dibenzyl sulfoxide (about 98% pure) and 209 being commercially pure dibenzyl sulfoxide.
[2] A type of dibenzyl sulfoxide from Germany.
[3] Acid contained 10 lbs. of FeS per 1,000 gallons. This forms $H_2S$ gas which destroys many inhibitors.

The foregoing data show the unexpected results using dibenzyl sulfoxide with HAI-34 in the presence of FeS.

The following data show the corrosion rate on J-55 steel in uninhibited 5% HCl, 5% HCl+$H_2S$, uninhibited 10% HCl, 10% HCl+$H_2S$, uninhibited 15% HCl, and 15% HCl+$H_2S$ at 150° F. It should be noted that the following data are reported in corrosion in lbs./ft.$^2$ based upon a test time of six hours rather than in corrosion in lbs./ft.$^2$/24 hrs. as in the foregoing examples.

TABLE I.—DATA

Test temp.—150° F.
Test time—6 hours
Metal type—J-55 steel
Acid volume-surface area ratio—25 cc./in.$^2$

| Corrodent | Contaminant [1] | Corrosion in lbs./ft.$^2$ |
|---|---|---|
| 5% HCl | None | 0.31 |
| Do | $H_2S$ | 0.35 |
| 10% HCl | None | 0.51 |
| Do | $H_2S$ | 0.54 |
| 15% HCl | None | 0.63 |
| Do | $H_2S$ | 0.68 |

[1] The hydrogen sulfide was introduced by bubbling it through the acid solutions.

The following tests were conducted to determine the effectiveness of dibenzyl sulfoxide alone and in conjunction with HAI-34 in 5%, 10% and 15% hydrochloric acid, with and without hydrogen sulfide present.

DATA—TABLE II

Test temperature—150° F.
Test time—6 hours
Metal type—J-55
Inhibitor:
   (A) 1.0% dibenzyl sulfoxide (w./v. percent)
   (B) 2.0% dibenzyl sulfoxide
   (C) 3.0% dibenzyl sulfoxide
   (D) 5.0% dibenzyl sulfoxide
   (E) 10% dibenzyl sulfoxide
   (F) 0.1% HAI-34
   (G) 1.0% dibenzyl sulfoxide + 0.1% HAI-34

NOTE: The acid solutions were all saturated. Saturation occurs at a concentration of somewhat less than 1.0% dibenzyl sulfoxide. In subsequent laboratory tests, it was determined that the solubility of dibenzyl sulfoxide in 15% hydrochloric acid was 0.012% at 207° F. At lower temperatures, the solubility was less.

| Corrodent | Contaminant | Corrosion in lbs./ft.$^2$ | | | | | | |
|---|---|---|---|---|---|---|---|---|
| | | A | B | C | D | E | F | G |
| 5% HCl | None | 0.002 | | | | | | 0.001 |
| Do | 0.5% FeS | 0.005 | | | | | 0.008 | 0.004 |
| 10% HCl | None | 0.004 | | | | | | 0.001 |
| Do | 0.5% FeS | 0.008 | | | | | 0.100 | 0.006 |
| 15% HCl | None | 0.009 | 0.009 | 0.008 | 0.008 | 0.008 | | 0.006 |
| Do | 0.5% FeS | 0.021 | | | | | 0.200 | 0.007 |

NOTE: In the above table the corrosion rate in 15% HCl with no inhibitor was 0.670 lbs./ft.$^2$. A 1.0% solution of dibenzyl sulfoxide is one gram of dibenzyl sulfoxide/100 cc. of hydrochloric acid, or 83 pounds of dibenzyl sulfoxide/1,000 gallons of hydrochloric acid.

These examples further conclusively illustrate that when sulfides are present the corrosive rates of inhibited hydrochloric acid on ferrous metals is increased, and that the addition of sulfoxide compounds to inhibited hydrochloric acid substantially reduces the effect of the sulfides.

It can be appreciated from the above disclosure that a new and improved corrosion inhibitor deterioration reducer for hydrochloric acid in the presence of or contaminated with sulfides has been obtained and particularly one which is adapted for use as an additive to corrosion inhibitors for hydrochloric acid to enhance their effectiveness in such acid.

Broadly, the present invention relates to a corrosion inhibitor deterioration reducer or corrosion inhibitor additive for inhibited hydrochloric acid containing sulfide compounds.

Various modifications may be made in the invention within the scope of the appended claims without departing from the spirit of the invention.

We claim:

1. A non-corrosive fluid composition for use in the presence of sulfides, consisting essentially of an aqueous solution of hydrochloric acid, a corrosion inhibiting amount of an acetylenic alcohol subject to deterioration by sulfides, said sulfides being present in a sufficient amount to reduce the effectiveness of said acetylenic alcohol, and dibenzyl sulfoxide, said sulfoxide being present in a sufficient amount to reduce the deterioration effect of said sulfides on said acetylenic alcohol.

2. A non-corrosive fluid composition for use in the presence of sulfides consisting essentially of an aqueous solution of hydrochloric acid, a corrosion inhibiting amount of a 1-hexyn-3-ol subject to deterioration by sulfides, said sulfides being present in an amount sufficient to reduce the effectiveness of said 1-hexyn-3-ol, and dibenzyl sulfoxide, said sulfoxide being present in a sufficient amount to reduce the deterioration effect of said sulfides on said 1-hexyn-3-ol.

3. A method of acidizing a well formation having sulfides therein, comprising the steps of introducing into said well an aqueous solution of inhibited hydrochloric acid and dibenzyl sulfoxide, said hydrochloric acid being inhibited by the addition thereto of a corrosion inhibiting amount of an acetylenic alcohol hydrochloric acid inhibiting agent subject to deterioration by sulfides, and said acetylenic alcohol being inhibited from deterioration in the presence of said sulfides by the addition to said inhibited hydrochloric acid solution of a corrosion inhibitor deterioration reducing amount of said sulfoxide compound.

4. A method of inhibiting corrosion of ferrous metals in aqueous hydrochloric acid solution in the presence of sulfide compounds selected from the group consisting of hydrogen sulfide and iron sulfide, comprising the steps of: dispersing in said solution an acetylenic alcohol subject to deterioration in the presence of sulfides, and as an acetylenic alcohol deterioration reducing agent, dibenzyl sulfoxide.

References Cited

UNITED STATES PATENTS

| | | | |
|---|---|---|---|
| 1,877,504 | 9/1932 | Grebe et al. | 252—8.55 |
| 1,981,109 | 11/1934 | Klamroth et al. | 252—151 |
| 2,564,753 | 8/1951 | Cox | 252—392 |
| 2,952,635 | 9/1960 | Spivack et al. | 252—8.55 |
| 2,955,083 | 10/1960 | Levin | 252—8.55 |
| 3,003,955 | 10/1961 | Jones | 252—8.55 |
| 3,107,221 | 10/1963 | Harrison et al. | 252—8.55 |

FOREIGN PATENTS

| | | | |
|---|---|---|---|
| 914,698 | 7/1954 | Germany | 252—151 |

OTHER REFERENCES

Foster et al., "Acetylenic Corrosion Inhibitors," Articles in Industrial and Engineering Chemistry, Vol. 51, No. 7, July 1958, pp. 825–828.

HERBERT B. GUYNN, Primary Examiner

U.S. Cl. X.R.

252—391, 394, 395, 406